(12) United States Patent
Son

(10) Patent No.: US 7,865,168 B2
(45) Date of Patent: Jan. 4, 2011

(54) APPARATUS FOR CONTROLLING POWER CONSUMPTION IN PDA PHONE

(75) Inventor: Seong-Won Son, Gumi-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 762 days.

(21) Appl. No.: 11/771,145

(22) Filed: Jun. 29, 2007

(65) Prior Publication Data

US 2008/0119226 A1 May 22, 2008

(30) Foreign Application Priority Data

Nov. 21, 2006 (KR) .................. 10-2006-0115273

(51) Int. Cl.
*H04B 1/16* (2006.01)
(52) U.S. Cl. ............... 455/343.5; 455/556.2; 455/572; 455/574; 455/127.1; 455/550.1
(58) Field of Classification Search ........... 455/572, 455/574, 550.1, 127.1, 232.1, 343.1, 343.2, 455/343.3, 343.5, 343.6, 571
See application file for complete search history.

(56) References Cited

U.S. PATENT DOCUMENTS

| | | | | |
|---|---|---|---|---|
| 5,870,685 A * | 2/1999 | Flynn | .................. | 455/573 |
| 5,999,829 A * | 12/1999 | Chun et al. | .................. | 455/572 |
| 6,538,417 B2 * | 3/2003 | Marty et al. | .................. | 323/282 |
| 6,947,775 B2 * | 9/2005 | Okamoto et al. | ............ | 455/574 |
| 6,949,918 B2 * | 9/2005 | Clark et al. | .................. | 323/351 |
| 6,973,337 B2 * | 12/2005 | Jiguet et al. | .................. | 455/574 |
| 7,327,129 B2 * | 2/2008 | Chen et al. | .................. | 323/285 |
| 7,493,149 B1 * | 2/2009 | Doyle et al. | .................. | 455/574 |
| 2006/0087372 A1 * | 4/2006 | Henze | ........................ | 330/136 |

FOREIGN PATENT DOCUMENTS

KR    10-2000-0010350 A    2/2000

* cited by examiner

*Primary Examiner*—Charles N Appiah
*Assistant Examiner*—Olumide T Ajibade Akonai
(74) *Attorney, Agent, or Firm*—Jefferson IP Law., LLP

(57) ABSTRACT

An apparatus for controlling power consumption in a Personal Digital Assistant (PDA) phone is provided. The apparatus includes a PDA controller for applying a first signal or a second signal to a PDA voltage module, for sensing a voltage of a first capacitor changed according to the first or second signal, and for operating at the voltage of the first capacitor, and the PDA voltage module in which a first resistor is in a shorted or open condition according to the first or second signal, and a voltage applied to the first capacitor is changed according to the shorted or open condition of the first resistor.

13 Claims, 4 Drawing Sheets

APPARATUS FOR CONTROLLING POWER CONSUMPTION IN PDA PHONE

PRIORITY

This application claims the benefit under 35 U.S.C. §119(a) of a Korean patent Application filed in the Korean Intellectual Property Office on Nov. 21, 2006 and assigned Serial No. 2006-115273, the entire disclosure of which is hereby incorporated by reference.

BACKGROUND OF THE INVENTION

1. Field of the Invention

The present invention relates generally to a wireless terminal. More particularly, the present invention relates to an apparatus for controlling power consumption in a Personal Digital Assistant (PDA) phone.

2. Description of the Related Art

In general, a device in which both a Personal Digital Assistant (PDA) function and a wireless terminal function are implemented is a PDA phone or a smart phone. The PDA phone has basic PDA functions, such as a portable computer function, an electronic note function, an Internet search function, and a cellular phone function such as a conventional wireless phone function. In general, wireless terminals, such as a PDA phone, use a battery pack for operational power. However, the battery pack used in wireless terminals has limited power because of its small size. Accordingly, a method of saving power consumption is very important. More specifically, a desirable feature of PDA phones is their ability to perform multitasking. However, much power is consumed during multitasking. Thus, the performance and sales of PDA phones depend on a battery's capacity or useable time. In the past, in order to increase a useable time of a PDA phone, power consumed in the PDA phone was minimized by varying a core clock of a PDA controller using a Power Management Integrated Circuit (PMIC). However, in general, a circuit configuration using the PMIC is difficult to implement. Also, a volume of a circuit configuration using the PMIC is large. Thus, it is desired to increase a useable time of a PDA phone by minimizing power consumption of the PDA phone using a simple circuit configuration without a separate chip such as the PMIC.

SUMMARY OF THE INVENTION

An aspect of the present invention is to address at least the above-mentioned problems and/or disadvantages and to provide at least the advantages described below. Accordingly, an aspect of the present invention is to provide an apparatus for minimizing power consumption in a Personal Digital Assistant (PDA) phone using a simple circuit configuration.

According to one aspect of the present invention, an apparatus for controlling power consumption in a Personal Digital Assistant (PDA) phone is provided. The apparatus includes a PDA controller for supplying a first signal or a second signal, for sensing a voltage of a first capacitor changed according to the first or second signal, and for operating at the voltage of the first capacitor and a PDA voltage module in which a first resistor is shorted or open according to the first or second signal, and a voltage applied to the first capacitor is changed according to the shorted or open condition of the first resistor.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
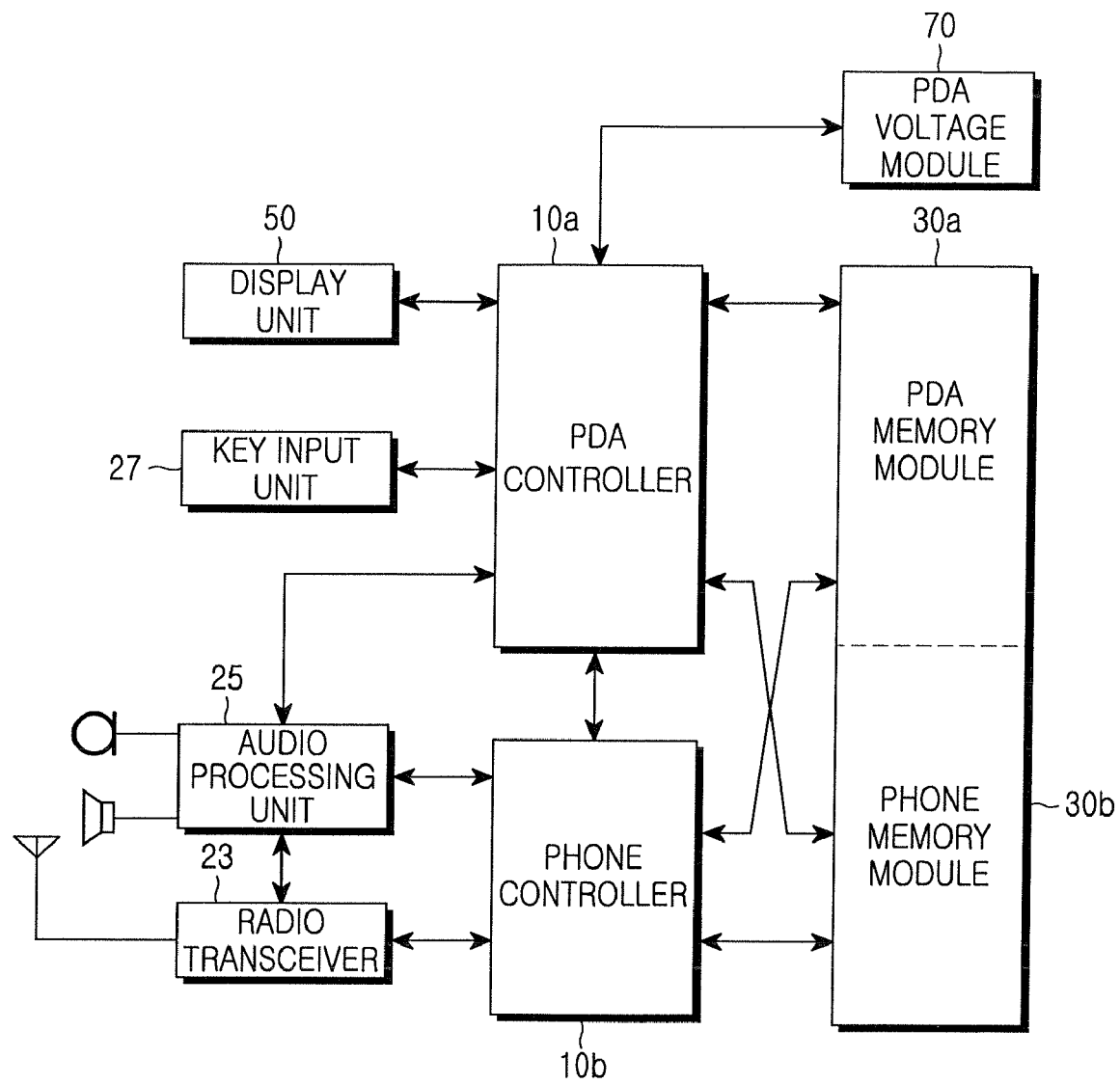
FIG. 1 is a block diagram illustrating a Personal Digital Assistant (PDA) phone according to an exemplary embodiment of the present invention.

FIG. 1 is a block diagram illustrating a Personal Digital Assistant (PDA) phone according to an exemplary embodiment of the present invention.

Referring to FIG. 1, a key input unit 27 includes keys to input number and character information and function keys to set various functions. The key input unit 27 receives key input data of a user and transmits the key input data to a PDA controller 10a.

A radio transceiver 23 performs a wireless communication function of the PDA phone and includes a Radio Frequency (RF) module (not shown) and a modem (not shown). The RF module includes an RF transmitter (not shown) for up-converting a frequency of a signal to be transmitted and for amplifying the frequency up-converted signal. The RF module also includes an RF receiver (not shown) for low noise amplifying a received signal and down-converting a frequency of the low noise amplified signal. The modem includes a transmitter (not shown) for encoding and modulating a signal to be transmitted and a receiver (not shown) for demodulating and decoding a signal received from the RF module.

An audio processing unit 25 can include a codec including a data codec and an audio codec. The data codec processes packet data, and the audio codec processes an audio signal such as voice and a multimedia file. The audio processing unit 25 converts a digital audio signal received from the modem to an analog audio signal using the audio codec and reproduces the analog audio signal. The audio processing unit 25 may also convert an analog audio signal generated by a microphone to a digital audio signal and transmit the digital audio signal to the modem. The codec may exist separately or be included in the PDA controller 10a or a phone controller 10b.

A PDA memory module 30a and a phone memory module 30b can be comprised of Read Only Memory (ROM) or Random Access Memory (RAM). The PDA memory module 30a and the phone memory module 30b can be comprised of a program memory and a data memory and store programs for controlling an operation of the PDA phone and data for booting. The PDA memory module 30a and the phone memory module 30b can be configured in a single memory or separately.

A display unit 50 displays an image corresponding to an image signal and user data output from the PDA controller 10a on a screen. The display unit 50 also displays data related to a phone call, which is output from the phone controller 10b. The display unit 50 can be made up of a Liquid Crystal Display (LCD) or Organic Light Emitting Diodes (OLED). If the LCD or OLED is implemented using a touch screen, the display unit 50 may operate as an input unit for controlling the PDA phone together with the key-input unit 27.

A PDA voltage module 70 includes a circuit for changing an operational voltage of the PDA controller 10a. As will be explained in more detail with reference to FIG. 2, the PDA voltage module 70 applies a voltage, which is changed according to a first or second signal input from the PDA controller 10a, to a first capacitor 76.

The PDA controller 10a controls a general operation of the PDA phone. The PDA controller 10a according to an exemplary embodiment of the present invention applies the first or second signal to the PDA voltage module 70 and operates with the voltage of the first capacitor 76, which is changed according to the first or second signal. Thus, the PDA controller 10a according to an exemplary embodiment of the present invention operates at a low operational voltage if the voltage of the first capacitor 76 is low, or operates at a high operational voltage if the voltage of the first capacitor 76 is high. Thus, the PDA controller 10a according to an exemplary embodiment of the present invention can operate at a low clock frequency with the low operational voltage or operate at a high clock frequency with the high operational voltage. The phone controller 10b controls a general operation for a phone call function.

Figure 2:
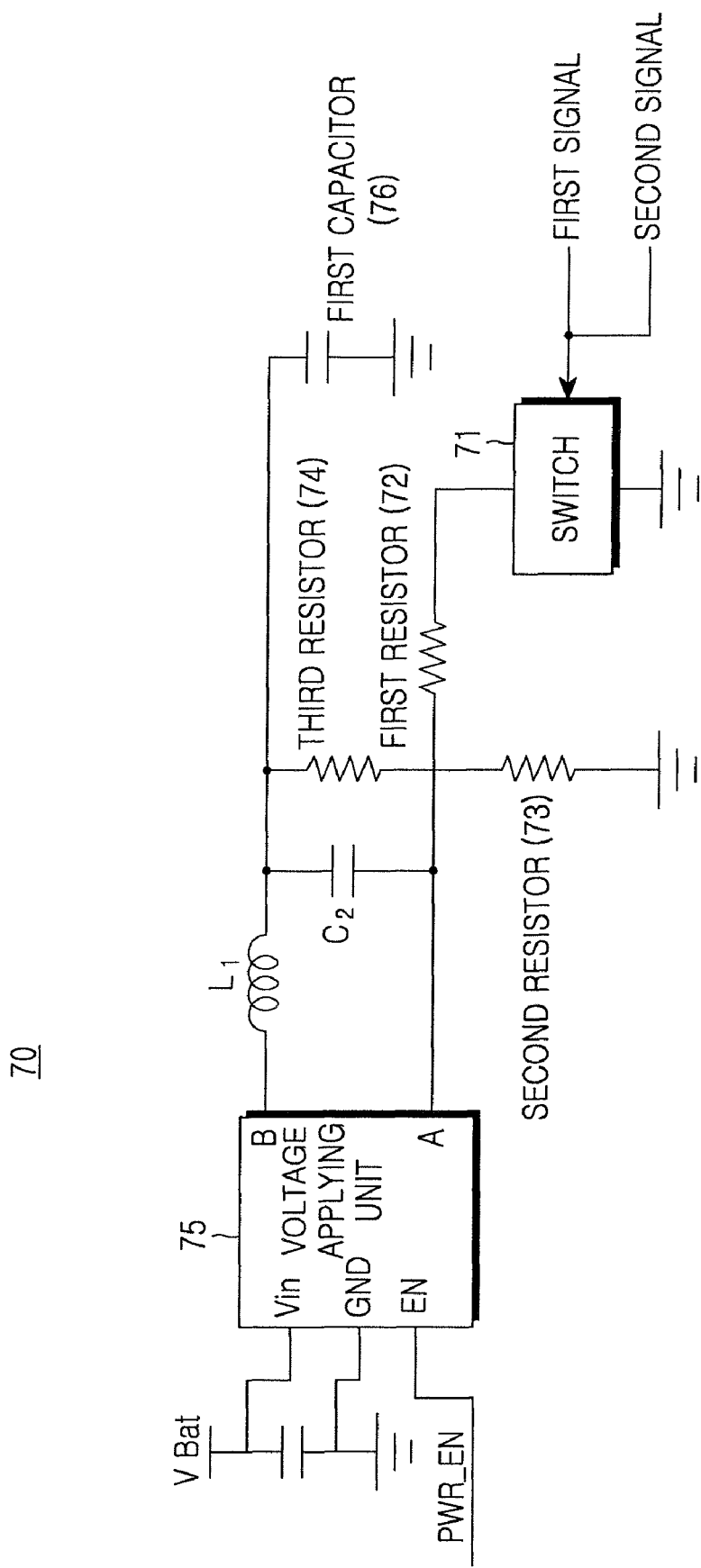
FIG. 2 is a circuit diagram illustrating a PDA voltage module according to an exemplary embodiment of the present invention.

FIG. 2 is a circuit diagram illustrating a PDA voltage module 70 according to an exemplary embodiment of the present invention.

Referring to FIG. 2, an exemplary PDA voltage module 70 includes a switch 71, a first resistor 72, a second resistor 73, a third resistor 74, a voltage applying unit 75, and the first capacitor 76. The PDA voltage module 70 may include a circuit ($L_1$ and $C_2$) to prevent oscillation of the voltage applying unit 75.

The switch 71 is turned on according to the first signal input from the PDA controller 10a and is turned off according to the second signal. In an exemplary embodiment, the switch 71 is a transistor that is turned on/off according to the first/second signal (e.g., a voltage for turning the transistor on or off).

The third resistor 74 is connected to the second resistor 73 in series, and the second resistor 73 is connected to the first resistor 72 in parallel. The first resistor 72 is connected to the switch 71. If the switch 71 is turned on, because the first resistor 72 is connected to the second resistor 73 in parallel, a voltage applied to the second resistor 73 is dropped. Conversely, if the switch 71 is turned off, the first resistor 72 is open and the voltage applied to the second resistor is not dropped.

If a driving signal PWR_EN is input, the voltage applying unit 75 operates by receiving a voltage from a battery voltage source VBat and raises or drops a voltage output via a port B according to a bias voltage (the voltage of the second resistor 73 input via a port A). The voltage of the second resistor 73 is changed according to an open or shorted condition of the first resistor 72, and the voltage output via the port B is applied to the first capacitor 76. In an exemplary embodiment, the voltage applying unit 75 is a Direct Current (DC)-to-DC converter. The DC-to-DC converter is a device (or circuit) for outputting an input DC voltage as a DC voltage. That is, the DC-to-DC converter generates an Alternating Current (AC) voltage by switching the input DC voltage and generates an output DC voltage by raising/dropping and rectifying the AC voltage. In another exemplary embodiment, the voltage applying unit 75 is a Low Dropout Regulator (LDO). The LDO may be used when a difference between an input voltage and an output voltage is small.

Figure 3:
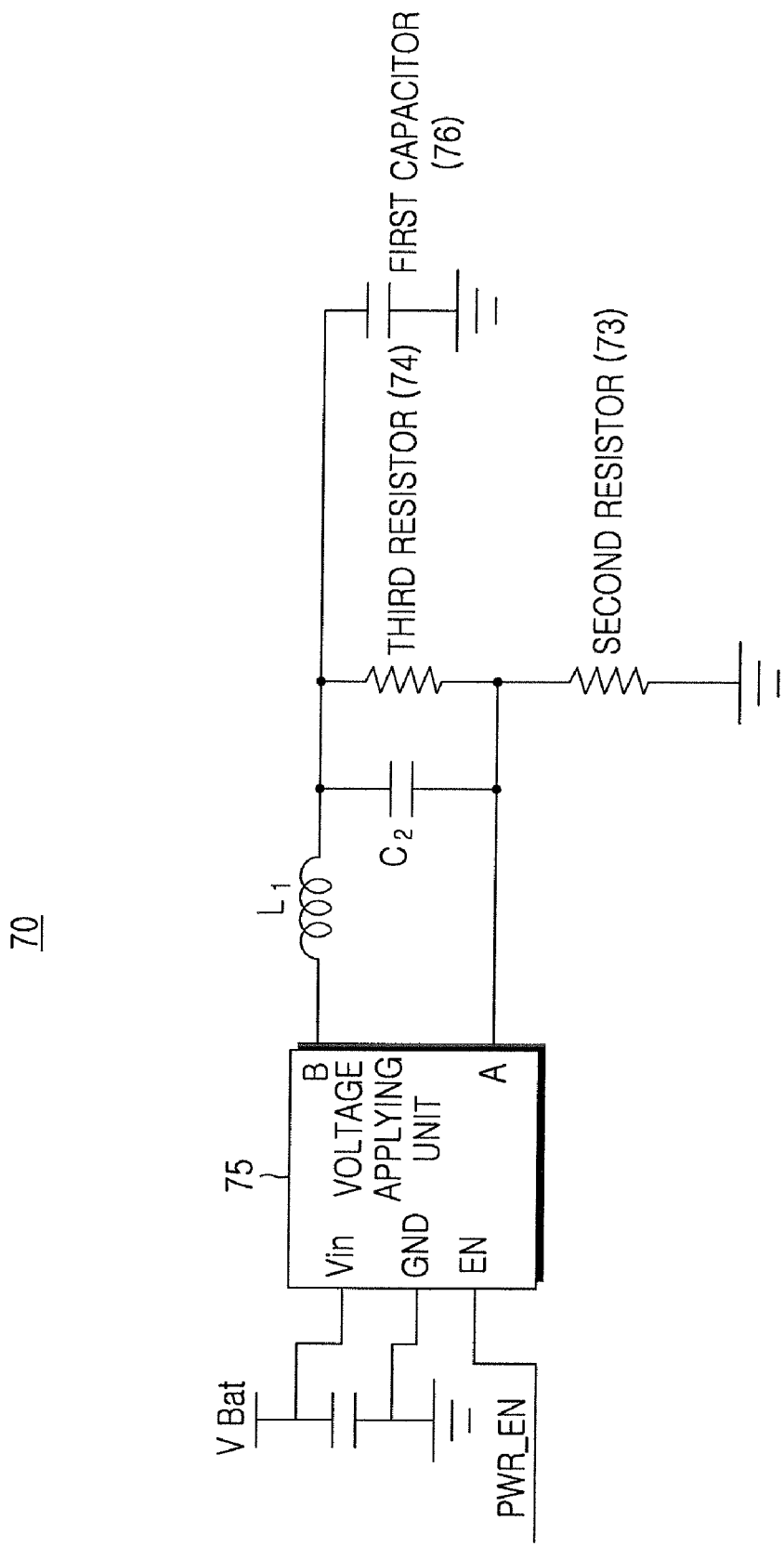
FIG. 3 is a circuit diagram illustrating a PDA voltage module to which a first signal is applied, according to an exemplary embodiment of the present invention.
Figure 4:
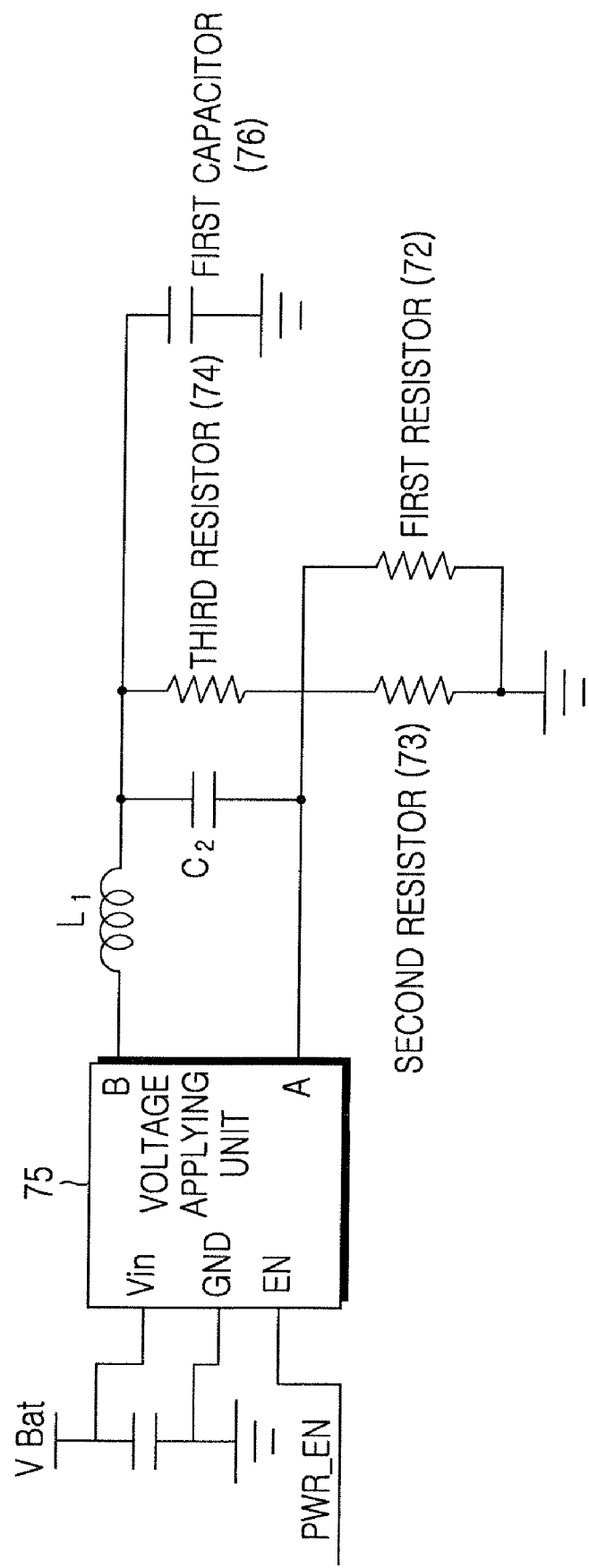
FIG. 4 is a circuit diagram illustrating a PDA voltage module to which a second signal is applied, according to an exemplary embodiment of the present invention.

FIG. 3 is a circuit diagram illustrating a PDA voltage module 70 to which the first signal is applied, according to an exemplary embodiment of the present invention. FIG. 4 is a circuit diagram illustrating a PDA voltage module 70 to which the second signal is applied, according to an exemplary embodiment of the present invention. The operations illustrated in FIGS. 3 and 4 will now be described with reference to FIG. 2.

In an exemplary embodiment, the switch 71 is a transistor and a gate of the transistor is turned on or off according to the first or second signal input from the PDA controller 10a. According to an on or off state of the transistor, the first resistor 72 is connected to the second resistor 73 in parallel or the first resistor 72 is in an open state, respectively. Furthermore, according to the parallel connection or open state of the first resistor 72, the voltage applied to the second resistor 73 is dropped (when the first resistor 72 is connected to the second resistor 73 in parallel) or raised (when the first resistor 72 is open). The voltage applied to the second resistor 73 is input to the voltage applying unit 75 via the port A. The voltage input via the port A acts as a bias voltage to change the voltage output from the voltage applying unit 75 via the port B. The voltage output via the port B is applied to the first capacitor 76. If the first resistor 72 is not connected to the second resistor 73 in parallel, the PDA voltage module 70 is equivalent to the circuit illustrated in FIG. 3. If the first resistor 72 is connected to the second resistor 73 in parallel, the PDA voltage module 70 is equivalent to the circuit illustrated in FIG. 4. That is, the voltage applied to the first capacitor 76 is changed according to whether or not the first resistor 72 is connected to the second resistor 73 in parallel. The PDA controller 10a operates at the voltage of the first capacitor 76. In this case, if the voltage of the first capacitor 76 is raised (corresponding to FIG. 3), the PDA controller 10a may operate by setting a clock speed higher, and if the voltage of the first capacitor 76 is dropped (corresponding to FIG. 4), the PDA controller 10a may operate by setting the clock speed lower. Thus, if an operating application needs a small amount of computation by the PDA controller 10a, the PDA controller 10a operates at a low voltage and a low clock frequency by applying the second signal to the PDA voltage module 70. If an operating application needs a large amount of computation by the PDA controller 10a, the PDA controller 10a operates at a high voltage and a high clock frequency by applying the first signal to the PDA voltage module 70.

As described above, according to exemplary embodiments of the present invention, by minimizing power consumption in a PDA phone without a complex circuit configuration, a useable time of the PDA phone can be maximized.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. An apparatus for controlling power consumption in a Personal Digital Assistant (PDA) phone, the apparatus comprising:
   a PDA controller for applying at least one of a first signal and a second signal to a PDA voltage module, for sensing a voltage of a first capacitor which voltage corresponds to the applied first or second signal, and for operating at the voltage of the first capacitor; and
   the PDA voltage module in which a first resistor is shorted or open corresponding to the applied first or second signal, and a voltage applied to the first capacitor corresponds to shorted or open state of the first resistor,
   wherein the PDA voltage module comprises:
   a switch for switching on when the first signal is input and for switching off when the second signal is input;
   the first resistor connected to the switch, which is shorted when the switch is turned on and which is open when the switch is turned off;
   a second resistor connected to the first resistor in parallel;
   a third resistor connected to the second resistor in series; and
   a voltage applying unit for changing the voltage applied to the first capacitor using a voltage of the second resistor corresponding to the open or shorted state of the first resistor.

2. The apparatus of claim 1, wherein the PDA controller lowers a clock frequency if the voltage of the first capacitor is lowered by application of the first signal to the PDA voltage module.

3. The apparatus of claim 1, wherein the PDA controller raises a clock frequency if the voltage of the first capacitor is raised by application of the second signal to the PDA voltage module.

4. The apparatus of claim 1, wherein the switch comprises a transistor.

5. The apparatus of claim 1, wherein the voltage applying unit comprises a Direct Current (DC)-to-DC converter.

6. The apparatus of claim 1, wherein the voltage applying unit comprises a Low Dropout Regulator.

7. An apparatus for controlling power consumption in a portable terminal, comprising:
   a voltage module, comprising a first resistor and a capacitor; and
   a controller,
   wherein the controller applies a signal to the voltage module, senses a voltage of the capacitor and operates in a condition corresponding to the sensed voltage,
   and further wherein the voltage module further comprises:
   a switch for switching on and off corresponding to the applied signal;
   a second resistor connected to the first resistor in parallel;
   a third resistor connected to the second resistor in series; and
   a voltage applying unit for applying voltage to the capacitor corresponding to the state of the first resistor.

8. The apparatus of claim 7, wherein the voltage of the capacitor corresponds to the signal applied by the controller.

9. The apparatus of claim 8, wherein a state of the first resistor comprises at least one of a shorted state and an open state corresponding to the signal applied by the controller, and the voltage of the capacitor corresponds to the state of the first resistor.

10. The apparatus of claim 9, wherein the controller lowers a clock frequency corresponding to a first sensed voltage of the capacitor and raises the clock frequency corresponding to a second sensed voltage of the capacitor.

11. The apparatus of claim 10, wherein the first voltage is lower than the second voltage.

12. The apparatus of claim 7, wherein the first resistor is connected to the switch such that the first resistor is in the shorted state when the switch is turned on and is in the open state when the switch is turned off, and further wherein a first voltage is applied to the capacitor when the resistor is in the shorted state and a second voltage is applied to the capacitor when the resistor is in the open state.

13. The apparatus of claim 12, wherein the switch comprises a transistor.

* * * * *